INVENTOR.
GÜNTER MYSKA
BY
ATTORNEY

Aug. 18, 1959 G. MYSKA 2,899,919
AUTOMATIC WORK CONTROL FOR MULTIPLE-OPERATION SEWING MACHINES
Filed Aug. 21, 1956 7 Sheets-Sheet 3

Fig.3

INVENTOR
GÜNTER MYSKA
BY
ATTORNEY

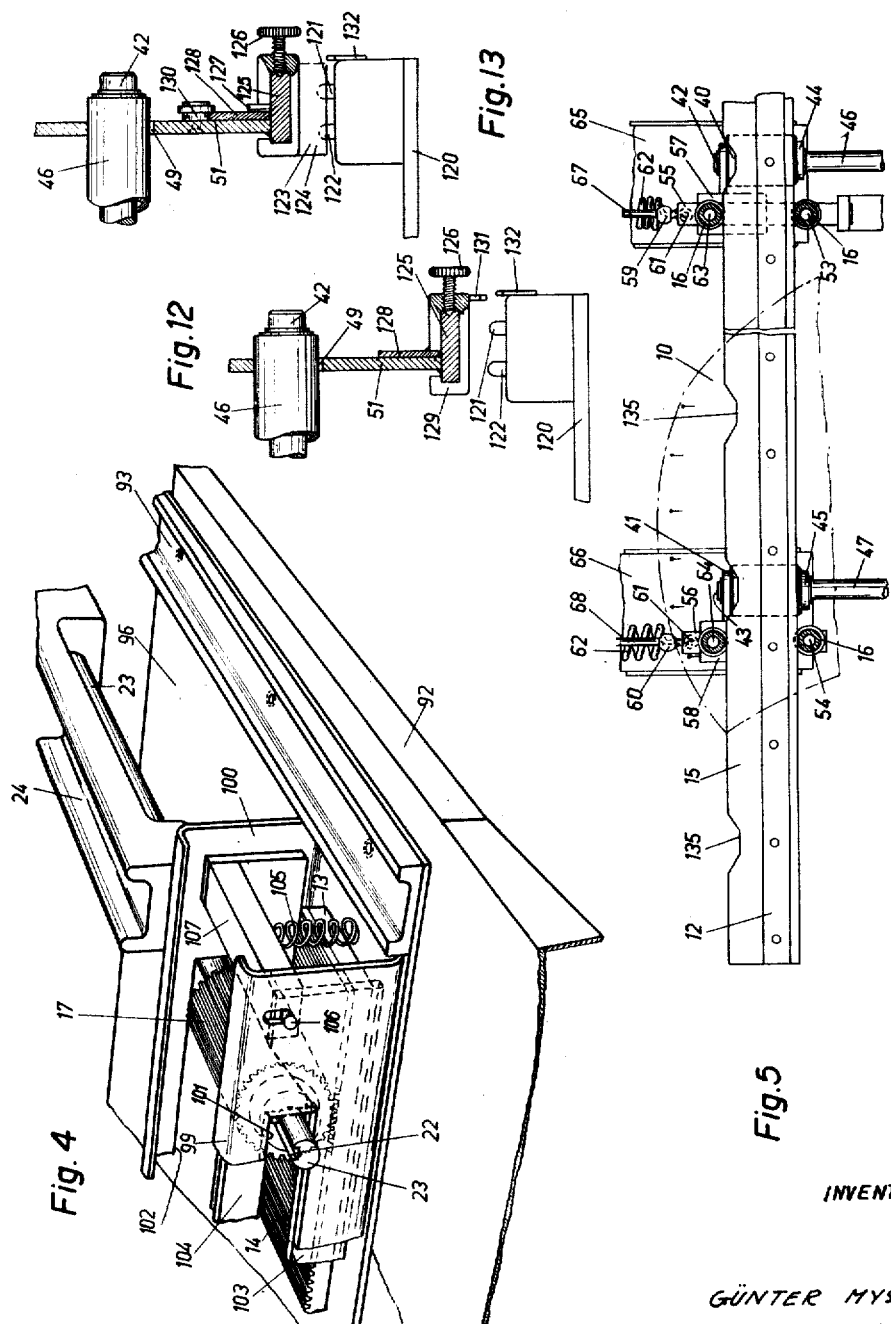

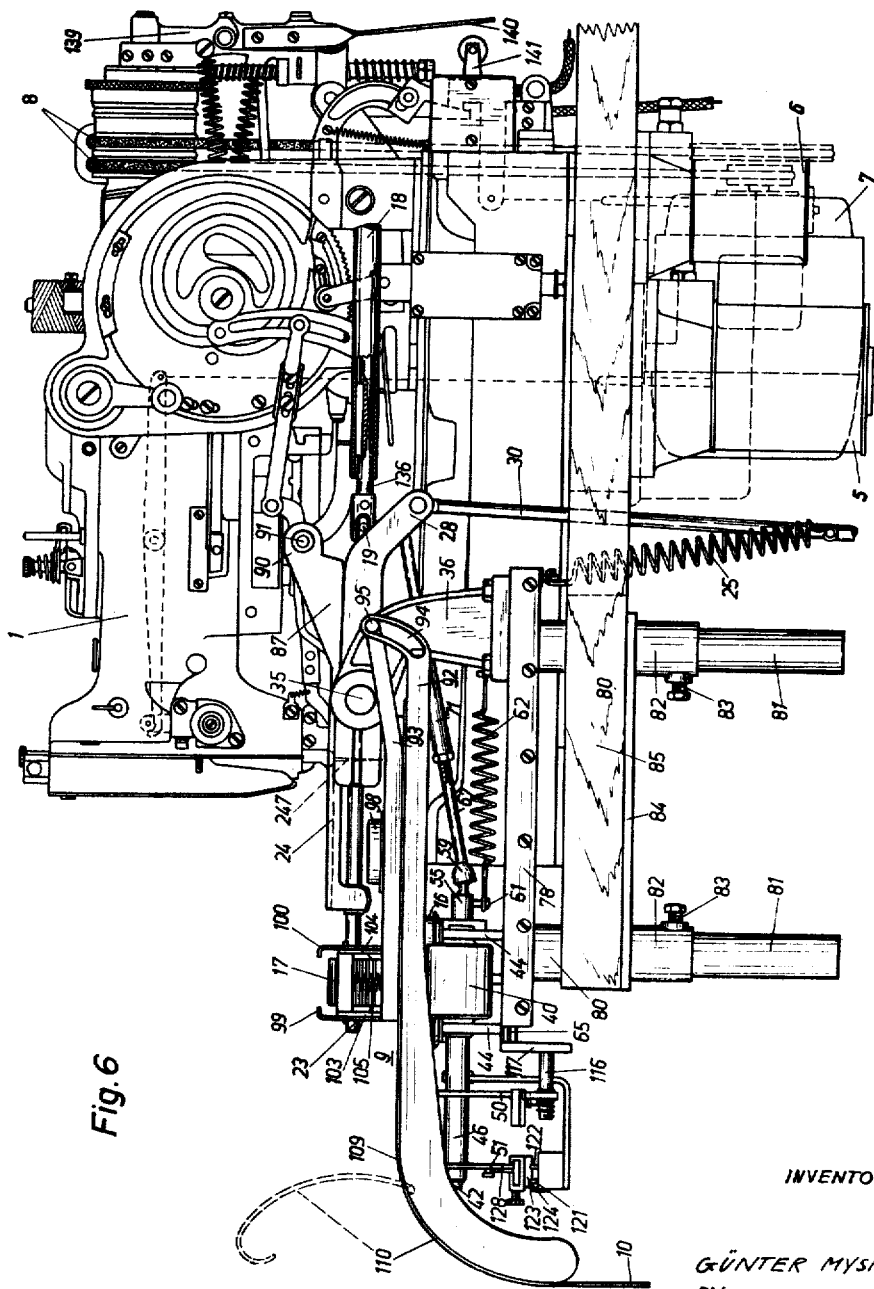

Aug. 18, 1959  G. MYSKA  2,899,919
AUTOMATIC WORK CONTROL FOR MULTIPLE-OPERATION SEWING MACHINES
Filed Aug. 21, 1956  7 Sheets-Sheet 6

INVENTOR
GÜNTER MYSKA
BY
ATTORNEY

Aug. 18, 1959 G. MYSKA 2,899,919
AUTOMATIC WORK CONTROL FOR MULTIPLE-OPERATION SEWING MACHINES
Filed Aug. 21, 1956 7 Sheets-Sheet 7

INVENTOR
GÜNTER MYSKA
BY
ATTORNEY

United States Patent Office 2,899,919
Patented Aug. 18, 1959

2,899,919

AUTOMATIC WORK CONTROL FOR MULTIPLE-OPERATION SEWING MACHINES

Gunter Myska, Kaiserslautern, Pfalz, Germany, assignor to G. M. Pfaff A.G., Kaiserslautern, Pfalz, Germany, a corporation of Germany Application August 21 1956, Serial No. 605,358

16 Claims. (Cl. 112—67)

The present invention relates to discrete-position control means for multiple-operation sewing machines, in particular group stitch sewing machines, to automatically advance or control a workpiece to be operated on between successive operating or group stitching cycles.

Arrangements for automatically effecting a plurality of successive operations at spaced and aligned operating points of a workpiece have already become known in the past, especially in connection with group stitch sewing machines. Thus, an arrangement has been proposed for button-hole sewing machines comprising a sliding member for effecting the work feed advance and a control device cooperating therewith. Similar means have been proposed for the fabrication of button-holes on shoe uppers. Finally, arrangements are known for the production of button holes upon elongated or band-shaped workpieces, whereby the work is fed between successive operating cycles. All these known arrangements utilize essentially mechanical control means and, among other disadvantages, are limited to specific spaced and aligned operating points.

An important object of the present invention is, therefore, the provision of an improved electromagnetic workpiece control system, especially suitable for use in connection with group stitch sewing machines, such as buttonhole sewing machines, by which the above and related difficulties and drawbacks inherent in the prior art control devices are substantially overcome.

A more specific object of the invention is to improve the flexibility and adaptability of a control device of this type by the provision of novel automatic feed control means for the step-by-step advance of a workpiece through a plurality of spaced and aligned operating points or stations.

Another object is the provision of a control device of this type whereby both the distance between successive operating points or stations, as well as the number of operating stations, may be varied and/or preselected by simple presetting or adjusting means, to suit any existing operating conditions or requirements.

Another object of the invention is the provision of a work feed control system of the above character which can be readily attached or embodied in machines of conventional design, in particular, group stitch sewing machines, and which can be removed when desired, without necessitating essential changes in the design and operation of the machines.

Yet another object of the invention is the provision of a work feed control system for group stitch sewing machines which can be easily adapted for use in connection with two or more machines to be simultaneously controlled and operated by means of a single control device.

The improved control device according to the invention consists of a mechanical part comprising a carriage for supporting or clamping and guiding a workpiece or a plurality of workpieces, on the one hand, and an arrangement for controlling the movement of said carriage, and in turn, the advance of the workpiece between operations, on the other hand, particularly means to release or initiate the successive operations upon termination of a workpiece feed or advance from one to the next operating points. The clamping arrangement to support the workpiece may consist of a pair of clamping plates hingedly connected together and serving to clamp the workpiece between them under pressure. The control of the work feed is effected by an electromagnetic control system designed in such a manner that both the distance between successive operating points as well as the number of automatically controlled operations may be preselected, to suit existing conditions and operating requirements.

Furthermore the device includes means for control of the carriage at right angle to its feed movement, effected by an exchangeable profiled rail or plate secured to or integral with the carriage and cooperating with relatively stationary pressure rollers, in the manner described in further detail hereafter.

More specifically, the device according to the invention may consist essentially of a drive motor controlling the carriage and, in turn, being controlled through a first switching relay, preferably a step relay, by a first control switch operated by a moving organ of the machine (starting lever, etc.), on the one hand, said same relay being controlled through a further control switch in response to the movement of said carriage on the other hand. The device furthermore comprises a starting pulse producing means operated in response to the movement of said carriage and serving to initiate the next operating cycle of the machine upon termination of a work feed movement.

According to an embodiment of the invention, both the means for the operation of said first control switch which, among others, serves to control the relay controlling the feed motor, as well as the means for the operation of the control switch which serves to control the starting pulse producing means responsive to the work feed movement, may consist of a plurality of spaced projections or switch actuators secured to the carriage or one of said clamping plates.

The starting of the sewing machine may be effected by means of a starting solenoid or electromagnet energized manually by the operator by means of a starting switch to initiate the first operation and subsequently controlled by said pulse producing means to automatically initiate the subsequent operations of a preselected number of operating cycles. The carriage feed motor may be disconnected at the termination of the entire preselecting programme by the division of a further switch actuator provided at the end of the carriage.

There may be furthermore provided a power switch for the control device which may be operated in one direction only, such as in a clockwise direction, and serves to control, through a further switch contact, the control relay of the feed motor to operate the latter to its On position in the non-operative or de-energized condition of the system.

In order to indicate the position of the control relay of the feed motor, a pilot lamp may be provided connected in the circuit of this relay. Furthermore, in order to enable an independent control of the relay for effecting readjustments in the case of failure or faulty operations, the relay may be provided with an auxiliary manual switch to change from On to Off position, and vice versa, respectively.

The starting pulse producing means may consist of a delayed-action relay shunted by a capacitor which is charged in the On position of the associated control relay.

In order to utilize a single control device for controlling a plurality of sewing machines, a further switch may be provided for the simultaneous connection of a plurality of solenoid or starting magnets for the common control of the starting means of all said machines.

The carriage is advantageously driven through a pinion being in driving connection with the feed motor and a rack attached to or integral with the carriage or one of said clamping plates. The driving pinion is connected through a shaft containing a pair of articulated joints with the drive shaft of the feed motor and supported in a lateral pivoted supporting arm subject to the action of a return spring. At the opposite side of the machine a similar pivoted supporting arm may be provided also subject to a return spring and supporting the shaft of a pressure roller engaging the carriage to apply adequate clamping pressure upon the workpiece similar to the pressure applied by said pinion. On the opposite side from the pinion and pressure roller, that is, upon the underside of the lower clamping plate where the rack is applied to the upper plate counter-pressure rollers may be provided having their shafts extended in the forward direction and engaging slots provided in vertical guide plates secured to the underside of the carriage, to provide adequate support for the carriage.

For the control of the carriage in a direction at right angle to the feed movement by the electric control device, there may be provided an exchangeable profiled rail or plate arranged in parallel to the clamping plates and cooperating with guide rollers mounted upon vertical axes, in such a manner that the guide rollers are disengaged from the profiled rail upon raising of the supporting arms of said pinion and pressure rollers, respectively.

The guiding parts for the carriage may be mounted upon a base plate which in the case of sewing machines where the workpiece is displaced during operation, follow the movement thereof and, in case of machines in which the needlehead or the stitch forming tools move relative to the workpiece, is mounted in stationary position.

The clamping plates may be connected by means of lateral arms extending in the rearward direction and which may be provided with rearward tapering pressure plates extending close to the operating point of the workpiece. The upper pressure plate may be provided with additional electromagnetic pressure devices to assist the clamping pressure exerted by said pinion and pressure roller. In this case, the upper pressure plate should consist of non-magnetic material. The upper pressure plate, which in the preferred embodiment in part forms a rack cooperating with the driving pinion, is extended upwardly on both sides to provide a pair of vertical guides provided with lateral slots to receive the shafts of said pinion and pressure roller, respectively.

The return movement of the carriage to starting position at the end of a complete operating programme may be effected either by a polarity change of the feed motor, or, alternatively, by means of a return rope provided with a spring and being tensioned during the advance feed movements of the carriage. In the latter case means are provided whereby, upon raising of the supporting arms to initiate the return movement, to effect disengagement of a pawl cooperating with a further rack upon the carriage. In order to release the pinion from its rack during the return movement of the carriage, further guide means may be provided movable within said vertical guides and subject to spring pressure in a direction opposite to the pressure applied by the pinion, the vertical movement of said additional guide means being limited by stop means, in such a manner as to effect a release of the pinion from its cooperating rack upon the carriage, upon raising said supporting arms to their end positions.

The lower pressure plate of the carriage may be extended in the forward direction to provide a work support and may be provided with a hinged door, to enable ready access to the switch actuating elements upon the carriage. A scale cooperating with the latter upon the carriage may be adjustable to enable setting of the first operating point. The base plate carrying the guiding parts for the carriage may be, in turn, guided within a bed or support which may be adjusted in a vertical direction by the insertion of suitable distance pieces to adapt the device to conventional sewing machine constructions. The entire carriage and supporting device may be secured to the table-top of an existing machine by means of suitable supporting legs, or the like in a manner disclosed and more clearly described in the following.

Although in the following, the invention will be described with specific reference to an automatic button-hole sewing machine, it will be understood by those skilled in the art that this disclosure is by way of example only and that other automatic group stitching or multiple-operation machines of this character may be readily adapted for use of the invention, to secure the novel advantages and results thereof.

The invention, both as to its further objects as well as novel aspects, will be better understood from the following detailed description taken in reference to the accompanying drawings forming part of this specification and wherein:

Fig. 3 is a perspective view of the machine shown in Fig. 1 with the work feed carriage removed;

Fig. 4 is a further partial perspective view more clearly illustrating the driving pinion and pivoted supporting arm therefor;

Figure 7:
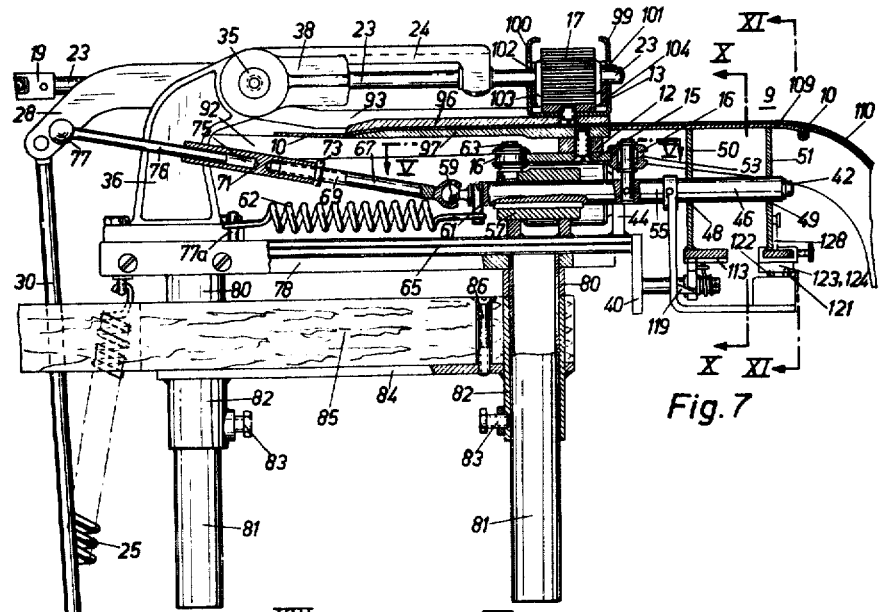
Figure 11:
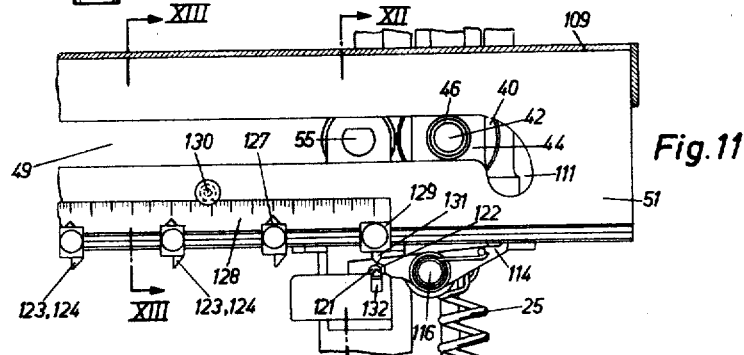
Figure 10:
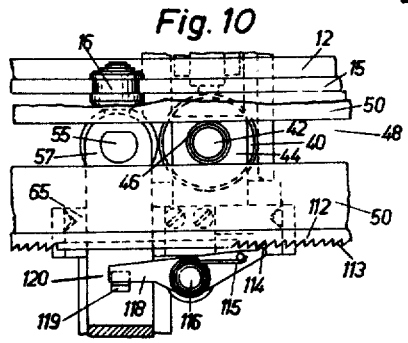
Figure 9:
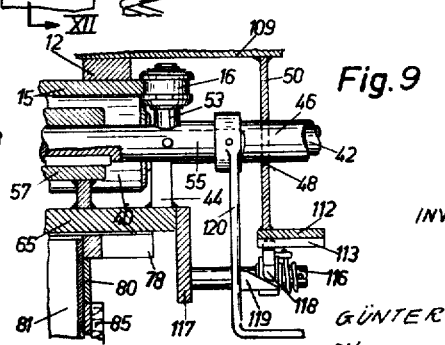
Figure 8:
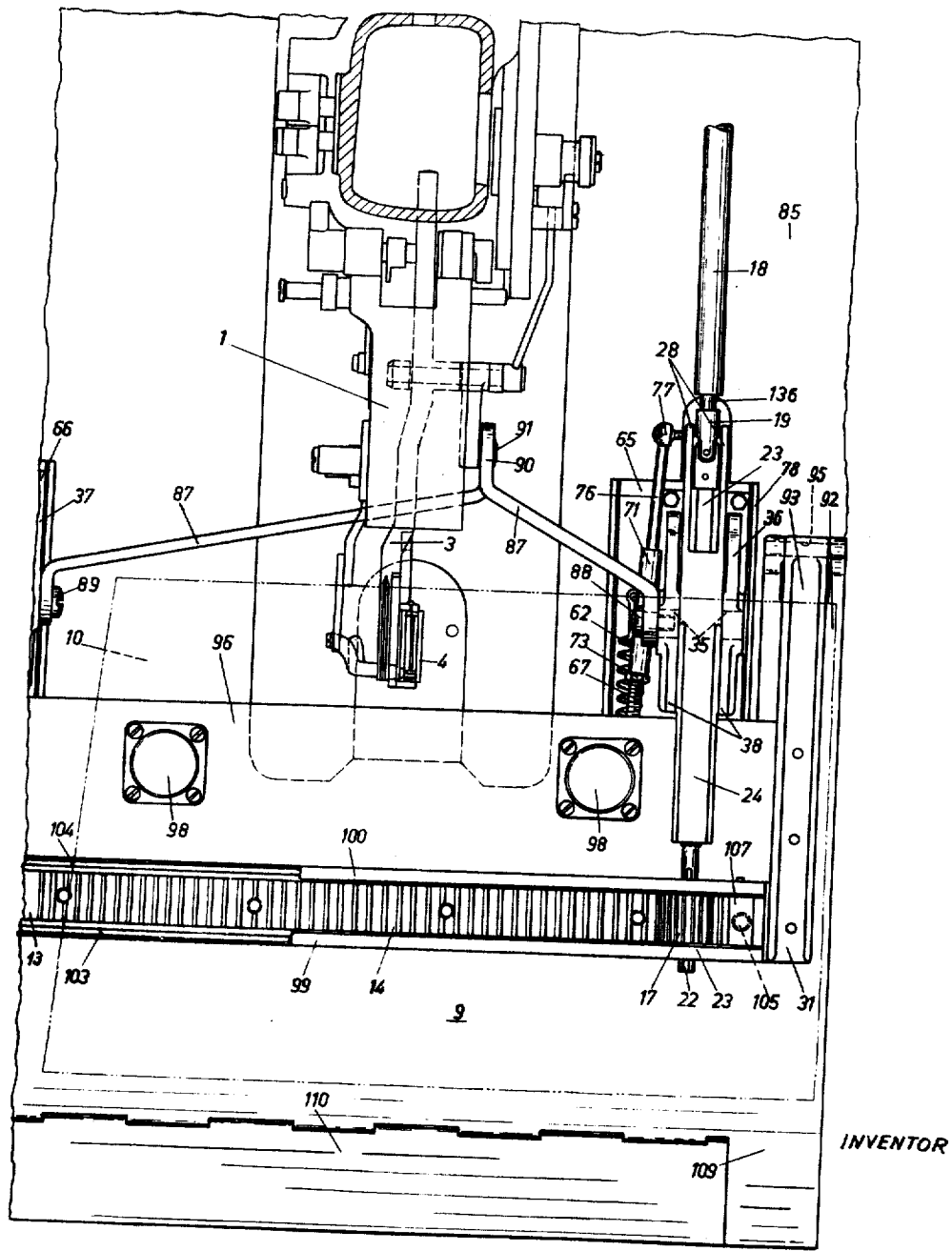

Fig. 5, taken on line V—V of Fig. 7, is a top view showing the profiled rail and guide rollers for the control of the work feed carriage at right angle to its normal feed movement;

Fig. 6 is a side view of the machine embodying the control device of the invention;

Fig. 7 is a partial view of Fig. 6 shown partly in section and viewed from the opposite side of the machine;

Fig. 8 is a top view of the two preceding figures;

Figs. 9 and 10 show partial views of Fig. 7, the latter as viewed in the direction of arrows X—X of Fig. 7;

Fig. 11, taken on line XI—XI of Fig. 7 illustrates a further detail showing the separate switch actuators upon the feed carriage and means for adjusting same;

Fig. 12 is a section taken from line XII—XII of Fig. 11;

Fig. 13 is a further section taken on line XIII—XIII of Fig. 11.

Like reference numerals identify like parts throughout the different views of the drawings.

Figure 1:
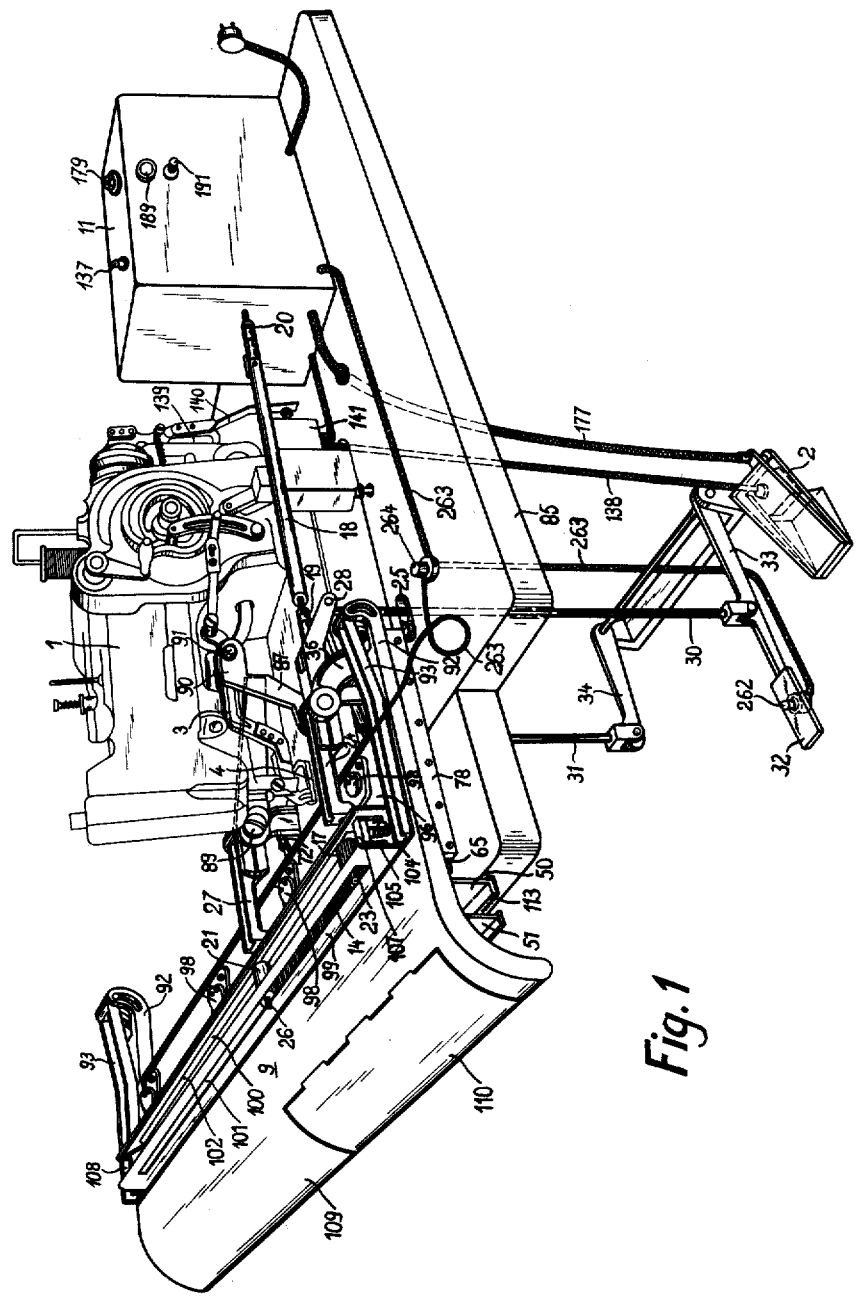
Fig. 1 is a perspective view of a button-hole sewing machine embodying means for the automatic work feed control according to the invention.

In a conventional button-hole sewing machine of the type collectively shown at 1 in Fig. 1, the workpiece may be reciprocated in a horizontal plane during the formation of a button-hole, while the button-hole stitches are performed by reciprocation in a vertical plane of the needle shaft. The cutting of the button-hole and the severing of the upper and lower thread are performed automatically by the machine.

Furthermore, the machine is provided in a known manner with an electric control, whereby a single foot-switch 2, Fig. 1, is used to raise and lower the work displacing frame 4 by means of the work presser foot 3, this resulting also in a starting of the machine. This control is constructed in such a manner that, in the inoperative condition of the machine, the work displacing frame 4 is maintained in raised position by the work presser magnet 5, Fig. 6, in order to enable insertion of a workpiece into the machine. If now the foot-switch 2 is initially pressed, this causes an interruption of the circuit of the work presser magnet 5, whereby the work displacing frame 4 is lowered upon the workpiece under the action of a spring. If the foot-switch 2 is then further depressed, a starting solenoid electromagnet 6 is energized, attracting its armature and operating the starting lever connected with the starting member and the belt shift guide of the machine, in such a manner as to cause the continuously running driving motor 7 to shift the belt 8 from the idling of the driving pulleys, thereby initiating the operation of the latter.

In order to prevent the work displacing frame 4 to return to its raised position during the sewing operation upon release of the foot-switch 2, the circuit of the work pressure magnet 5 may be interrupted in a known manner during the operation of the machine 1 by the opening of a safety switch contact provided for this purpose.

After the completion of an operating or sewing cycle, the machine 1 is automatically stopped by means of the usual stopping motion device well known in connection with conventional group stitch sewing machines. At the same time the aforementioned safety contact is again closed, the work presser magnet 5 is energized and the work displacing frame 4 moved to raised position, while the thread cutting device is set into operation, thus placing the machine in condition for the next operating cycle.

The arrangement for the automatic work feed control, according to the present invention, consists essentially of a work feed carriage 9 for supporting or clamping as well as guiding the workpiece 10, on the one hand, and an electric control device 11 controlling the advance movement of said carriage 9 on the other hand. In the embodiment shown, the carriage 9 includes a lower clamping plate 12, Fig. 7, and an upper clamping plate 13, the latter forming in part a rack 14, Figs. 1, 2 and 8. The clamping plates 12 and 13 form a clamping arrangement together with the parts described in the following, to clamp the workpiece 10 or workpieces to be intermittently fed or advanced by the control device 11. The clamping plates 12, 13 are hingedly connected by pins 35, Figs. 6 and 7, and are pressed together in the operative position to firmly support the workpiece 10 or workpieces. The electric control device 11 is designed in such a manner as to enable a selection of the feed movements both as to the number of movements and distances between the individual movements within an entire operating schedule or programme.

In order to displace the carriage 9 at right angle to the feed movement, a further profiled rail 15, Figs. 5 and 7, may be provided which cooperates with front and rear guide rollers 16 mounted upon vertical shafts.

Cooperating with the rack 14 provided upon the upper clamping plate 13, in the example shown, is a pinion 17 driven by a feed motor of the control device 11 through a shaft 18 including a pair of articulated joints 19 and 20, Fig. 1. The pinion 17 at the same time serves for the purpose of applying adequate clamping pressure upon the clamping plate 13. For the same purpose, there is provided an additional pressure roller 21, Fig. 1, arranged at the opposite end of the machine.

The shaft 23 of the driving pinion 17 provided at its front end with a guide slot 22, Fig. 4, is supported by a pivoted lateral supporting arm 24 subject to the action of a return spring 25, Fig. 6. Similarly, the shaft 26 of the pressure roller 21 is supported by a supporting arm 27, Fig. 1, which is also pivotally mounted and subject to the action of a return spring similar to the supporting arm 24. The supporting arms 24 and 27 are provided at their rear ends with depending forks 28 and 29, Figs. 1 and 3, respectively, to which are articulated connecting rods 30 and 31 which are, in turn, connected, respectively, to a double-arm lever 33 provided at one end with a pedal 32, Fig. 1, and a lever 34 rotatably connected to the other end of said first lever. The supporting arms 24 and 27 are furthermore provided with lateral pins 35, Fig. 8, which are supported by a pair of slit bearings 36 and 37, respectively. In order to take up any lateral pressure upon the supporting arms 24 and 27, the bearings 36 and 37 are provided with a pair of forward guides 38 and 39, Fig. 3.

Opposite to the pinion 17 and the pressure roller 21, that is, in the example shown, upon the underside of the lower clamping plate 12, are provided a pair of counter-pressure rollers 40 and 41, Fig. 3, for the clamping plates 12, 13, said rollers being rotatably supported by horizontal shafts 42 and 43 which are mounted in bearings 44 and 45, respectively. The shafts 42 and 43 are extended in the forward direction and are provided with loosely fitting sleeves 46 and 47 passing through slots 48 and 49 in a pair of depending guide plates 50 and 51 secured to the carriage 9, Figs. 7 and 11.

The front guide rollers 16, Figs. 3, 5 and 7, engaging the front edge of the profiled rail 15 are freely rotatable about vertical axles 53 and 54 inserted in slidable members 55 and 56. The latter may be displaced within supports 57 and 58 and are provided at their rear ends with ball joints 59, 60 and pins 61 for the attachment of springs 62. The stationary guide rollers 16 engaging the rear edge of the profiled rail 15 are freely rotatable about axles 63 and 64.

The slit bearings 36 and 37, the bearings 44 and 45 and the supports 57 and 58 are mounted upon base plates 65 and 66, respectively.

The ball joints 59 and 60, Figs. 3 and 7, are fitted at rods 67 and 68 which are attached by means of threads 69 and 70 in connecting members 71 and 72 and secured by means of nuts 73 and 74. The connecting members 71 and 72 are provided with bores 75 within which slide rods 76 which are articulated through ball joints 77 to the forks 28 and 29 of the supporting arms 24 and 27, respectively.

The rear ends of the springs 62 are hooked upon pins 77a secured to the base plates 65 and 66, Figs. 3 and 7. The latter are guided in the beds 78 and 79 which are adjustable in height by the interposition of separating pieces 80 and in this manner may be adapted for use on conventional machines by means of depending supports 81 which may be secured within tubes 82 by clamping screws 83. The tubes 82 are inserted in plates 84 which, in turn, may be attached to the table-top 85 of the machine 1 by means of screws 86.

The base plates 65 and 66 are connected with each other through a link 87, Figs. 3 and 8, said link 87 being in turn connected with a part of the machine 1 moving together with the workpiece 10 during the sewing operation. In the case of a buttonhole sewing machine 1 as shown in the drawing, the link 87 being passed under the arm of the machine 1 is supported on both sides by means of pivot screws 88, 89 screwed into the pins 35 of the supporting arms 24 and 27, while the remaining end of the link 87 forming an angle piece 90 is secured to a part 91 moving with the presser foot 3. In case of a construction where the workpiece 10 is displaced during the operation, the base plates 65 and 66 may be connected in similar fashion with the work support of the machine 1. In case of sewing machines where the work is stationary and the needle-head displaced during operation, the base plates 65 and 66 may be fixed, whereby the link 87 is dispensed with.

The clamping plates 12 and 13 are pivotally connected through further lateral arms extending in a rearward direction. For this purpose the lower arms 92 are provided with slotted rear ends to form guides 94 adapted to receive bolts 95 connected to the upper arms 93, Fig. 8.

Furthermore, the clamping plates 12 and 13 have attached thereto pressure plates 96 and 97 which are extended and taper in a rearward direction close to the operating or stitching point of the workpiece 10. In order to increase the pressure by the pinion 17 and the pressure roller 21 upon the workpiece 10, the upper pressure plate 96 may have mounted therein suitable electromagnetic pressure devices 98. In this case the upper plate 96 should consist of a non-magnetic material.

The upper clamping plate 13 is extended vertically on both sides to provide a pair of guides 99 and 100, Figs. 1 and 4, formed with lateral slots 101 and 102 to receive the shafts 23 and 26 of the pinion 17 and pressure roller 21. Arranged within the guides 99 and 100 and parallel thereto are a pair of further guide plates 103 and 104, Figs. 4 and 7, urged by a spring 105 in a vertical direction, that is, opposite to the direction of the pressure exerted by the weight of the pinion 17 and the pressure roller 21, the vertical movement of the guide plates 103 and 104 being limited by stops 106 moving within vertical slots in the guides 99 and 100. The guide plates 103 and 104 are further connected at the opposite ends through connecting members 107 and 108 to which are attached the stops 106 and which are engaged by the springs 105. These guide plates 103 and 104 serve for the purpose of releasing the pinion 17 from its rack 14 upon fully raising the supporting arms 24 and 27 to initiate the return movement of the carriage 9 to its starting position. More particularly, upon raising of the arms 24 and 27, the normal pressure of the pinion 17 upon the rack 14 decreases gradually, whereby the guide plates 103 and 104, being connected with one another by the members 107 and 108 and subject to the action of spring 105, will be raised by the latter, to result in the release of the pinion 17. The lower pressure plate 97 is extended in the forward direction to provide a work support 109, Fig. 1, which may be provided with an opening closed by a hinged cover 110 to afford access to the switch actuators supported by the carriage in order to make adjustments and repairs.

The guide plates 50 and 51 are arranged underneath the work support 109 and fixedly connected thereto, Figs. 7 and 11. The lateral slots 48 and 49 in the guide plates 50 and 51 terminate in downwardly directed curved end portions 111, Fig. 11, similar curved portions being suitably provided in the guides at distances corresponding to the spacing distances between the shafts 42 and 43. This enables an easy removal of the carriage and clamping device from the machine.

The guide plate 50, Figs. 7, 8 and 10, carries at its lower end a plate 112 provided with or carrying a rack 113 which cooperates with a pawl 114. The latter is provided at the end of a double-arm spring urged lever 115 pivoted about a shaft 116. The shaft 116 is connected to an arm 117 secured to the front edge of the base plate 65. The opposite arm 118 of the said lever 115 projects into the path of a release lever 119 which is secured to an angular member 120 connected with the slidable member 55. The angular member 120 has a front portion bent in the forward direction and carrying two switches 121 and 122 cooperating with switch actuators 123 and 124, Fig. 13, adjustably securable to a plate 125 connected to the guide plate 51, and securable by screws 126.

The switch actuators 123 and 124 are provided with index marks 127 cooperating with a scale 128, Figs. 11, 12 and 13, which is connected to a sliding member 129 displaceable upon and securable to the plate 125. The scale 128 is guided by rollers 130 mounted in spaced relation upon the guide plate 51. The sliding member 129 carries a pointer 131 pointing in a downward direction and cooperating with an adjusting mark 132 upon the switches 121 and 122.

Mounted upon the bed 79 is a spring urged drum 133, Fig. 3, supporting a rope 134 which is connected to the carriage 9 so as to be tensioned during the advance movements thereof.

The return movement of the carriage 9 is effected, upon raising of the supporting arms 24 and 27 by the pedal 32, by the release lever 119, Fig. 7, whereby to operate the slidable member 55 and the rods 67 and 76 and causing disengagement of the pawl 114 from the rack 113.

The work feed carriage 9 is readily exchangeable and can be disengaged in a simple manner from the counter pressure rollers 40, 41 and the guide rollers 16 engaging the profiled rail 15. In this case the guide rollers 16 mounted upon the slidable members 55 and 56 by the action of the rods 67, 76 or 68, respectively, are moved forward and released from the profiled rail 15 by depressing the pedal 32.

In order to effect movement of the carriage 9 at right angle to the feed movement controlled by the electric control device 11, the profiled rail 15 may be exchangeable. If the workpiece 10 is to be fed in a single direction only, a rail having a straight profile may be used cooperating with the guide rollers 16. If the operating points upon the workpiece 10, such as in the case of a waistcoat as indicated in Fig. 5, are relatively displaced, the profiled rail 15 may be provided with suitable recesses 135 at its profiled edge engaged by the rear guide rollers 16.

The electric control device 11, Fig. 1, which is connected with the operating parts through the shaft 18 comprises essentially an arrangement which, upon actuation of the starting button 137 to initiate the first operating cycle of the sewing machine 1, subsequently causes the entire preselected operating programme to be carried out fully automatically and the sewing machine 1 to be stopped and returned to its starting position, upon completion of the last operating cycle of the programme.

Figure 2:
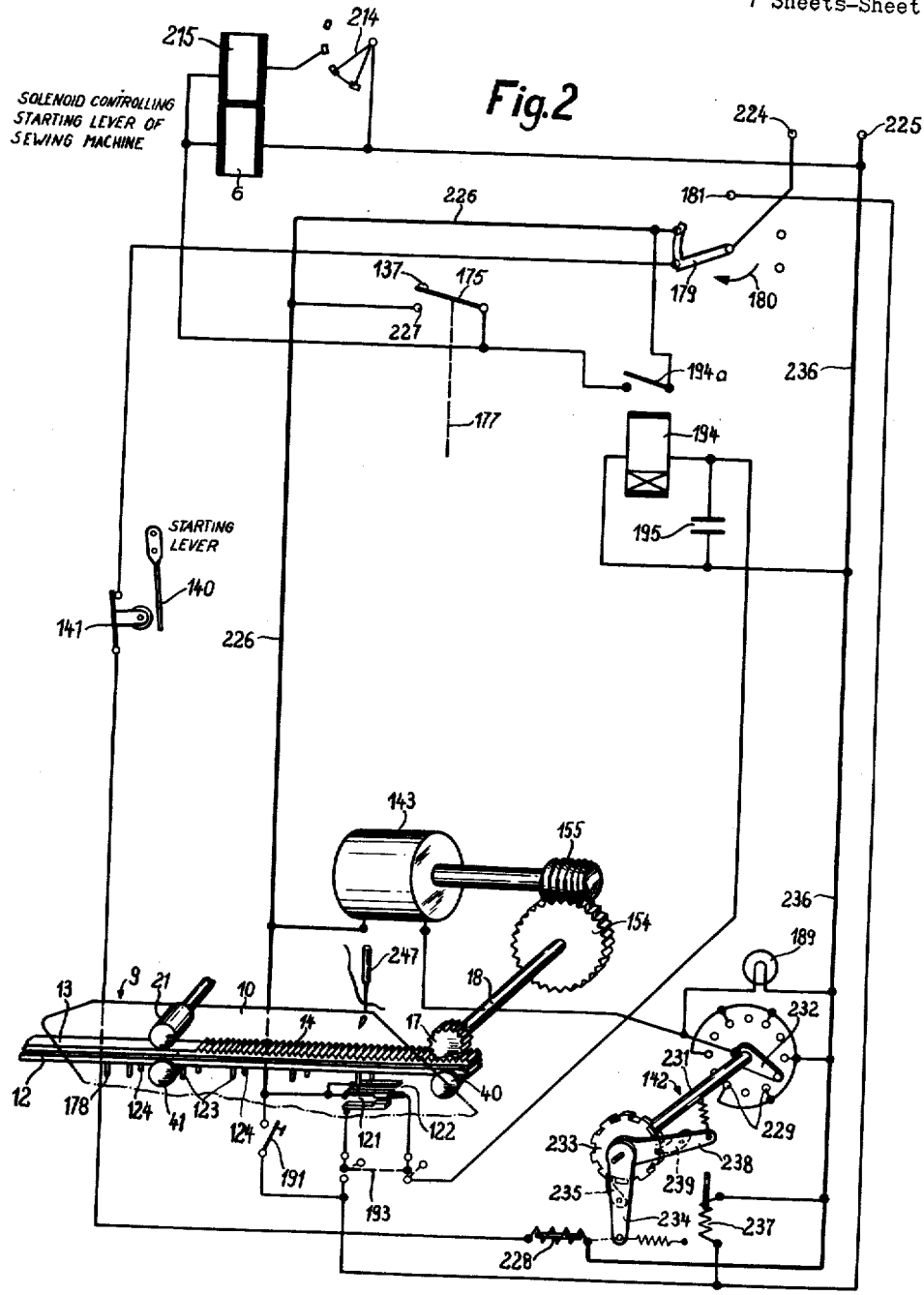
Fig. 2 is a wiring diagram of one type of electric work feed control according to the invention.

In order to use the sewing machine 1 in cooperation with the control device 11, a contact 141 connected with the starting lever 139 through an actuating lever 140, Fig. 2, is closed in the normal or inoperative position of the machine and is automatically opened while the sewing machine 1 is in operation.

Referring in greater detail to the electrical control device 11, this consists essentially of a first relay 142 in the form of a step switch for the control of the feed motor 143, said relay 142 being controlled by the first carriage-operated switch 121, Fig. 2, as well as the contact 141, on the one hand, and a starting pulse generator in the form of a delayed-action relay 194, shunted by an electrical capacitor 195, the operating contacts of this relay being inserted in the circuit of the solenoid 6 and controlled by the second carriage-operated switch 122, on the other hand. The switches 121 and 122 are arranged in the path of movement of the indexing devices or switch-actuators 123 and 124 adjustably secured to the work feed carriage 9.

The aforedescribed embodiment of the control device includes a switch 175 operable by a starting button 137, to control the solenoid 6 connected with the foot-switch 2 through a wire or chain coupling 177, Fig. 1, in order to start the sewing machine 1 upon energization of the solenoid 6, in a manner readily understood.

There is furthermore shown a power switch 179, Figs. 1 and 2, which may be rotated only in a single direction such as in clockwise direction, as indicated by the arrow 180 and which is provided with a further contact 181 connected with the relay 142 for the purpose to be described presently.

In the embodiment of the control device 11 according to Fig. 2 there is furthermore provided at the end of the series of switch actuators 123 and 124 upon the carriage 9 a final actuator 178 arranged to actuate only the switch 121 and serving to disconnect the feed motor 143 upon completion of a complete operating programme by the sewing machine 1.

In order to indicate the position of the relay 142, pilot lamp 189 may be connected in the circuit of this relay. Furthermore, the circuit of the relay may include an additional auxiliary switch 191 which serves to manually advance the relay from ON to OFF position, and vice versa, in case of failures or if readjustments of the control device are required.

Furthermore, in order to control a number of sewing machines simultaneously by means of a single control device, a further switch 214 may be provided for the connection of a plurality of solenoids 215 and so on, to control the respective sewing machines.

Alternatively, in place of the spring loaded cable 134, the return of the carriage 9 at the end of a complete operating programme may be effected by a polarity reversal of the drive motor 143. For this purpose, there may be provided a further switch or contact closed upon reaching of the end position of the carriage, to reverse the polarity and to initiate the return movement of the carriage by the motor 143. In such a case, a further contact may serve to again reverse the polarity at the end of the return movement of the carriage to its starting position.

Further details of the construction and operation of the control device of the invention will become more apparent from the following description of the operation thereof.

Let it be assumed that the carriage 9 is in its starting or zero position as shown in Fig. 1. By the operation of a further switch (not shown) the drive motor 7, Fig. 6, is started and the electromagnet 5 for the raising and lowering of the work displacing frame 4 and for the starting of the machine connected to the power source, such as a standard power or house lighting network. As a result, the motor 7 drives the idler pulleys of the machine through the belt 8 and the frame 4 is moved to raised position by the work pressure magnet 5, to enable insertion of the work or fabric into the machine.

Upon subsequent operation of the power-switch 179 to the position shown, the automatic control device 11 is connected to the power source and at the same time the electromagnetic pressure devices 98 are energized, the latter being connected to the device 11 through connecting leads or cords 263 and to the push-button switch 262 upon the pedal 32 by way of a socket and plug connection 264, to apply operating voltage to the various control and operating devices.

The sewing machine 1 is now ready for operation. Upon initially depressing the pedal 32, Fig. 1, at first the push-button switch 262 is operated resulting in an interruption of the pressure magnets 98. Subsequently the supporting arms 24 and 27 carrying the shafts 23 and 26 and, in turn, the upper part of the carriage 9, Fig. 10, are moved to raised position against the action of the springs 25, to enable insertion of the workpiece 10 upon the lower pressure plate 97. The workpiece 10 is arranged in such a manner below the frame 4 that the first button-hole will be sewed at a desired starting point upon the work or fabric, as indicated in Fig. 8. The pedal 32 is then released to cause the upper part of the carriage 9 to be lowered in the manner described and to reapply the electromagnetic pressure by the devices 98 by closing of the push-button switch 262. Due to the action of the springs 25 and the electromagnetic pressure devices 98, the workpiece 10 is firmly clamped between the pressure plates 96 and 97 of the carriage 9, Fig. 7. For light workpieces which require only a limited pressure, the electromagnetic pressure devices 98 may be disconnected by removing the plug from the socket 264 so that only the springs 25 serve for holding and supporting the workpiece or pieces.

The control of the carriage 9 is effected by the electric control device according to Fig. 2, wherein the advance movement of the workpiece 10 and the number of movements are determined by the number of switch-actuators 123, 124 arranged parallel to the carriage 9 adjustment may be made in advance of the operation by opening hinged cover 110 of the work support 109 to afford easy access to the switch actuators 123, 124, Figs. 11 to 13. In order to effect adjustment, the initial position of the scale 128 is set by means of its sliding member 129 until the pointer 131 coincides with the adjusting mark 132 associated with the switches 121 and 122. The sliding member 129 is then secured to the plate 125, Fig. 12 by tightening the screws 126.

In this manner, the number of and relative distances between the actuators 123, 124 secured to the plate 125, Figs. 11, 13 may be preselected for which purpose the actuators are provided with suitable index marks 127 cooperating with scale 128. Since the first operation is started manually, the number of switch-actuators 123 and 124 is less by one unit than the number of operations to be performed. As pointed out, there is furthermore provided a final actuator 178 spaced close to the last pair of actuators 123 and 124 as indicated in Fig. 2 and serving to interrupt or stop the driving motor 7 at the end of the complete operating programme.

After closing of the cover 110, the sewing machine 1 is started by depressing the starting button 137 to automatically carry out a preselected number of successive stitching operations and to produce a corresponding number of button-holes, or to perform any other multiple group-stitch operation by the sewing machine 1.

More specifically, the electric control device according to Fig. 2 is connected to the power source by way of input terminals 224 and 225. After the power-switch 179 has been closed, operating voltage is applied, by way of line or conductor 226, to the contact 227 of the switch 175, to the control switches 121 and 122, as well as to the magnet winding 228 of the relay 142 by way of the contact 141 which is closed in the non-operative condition of the machine 1. Similarly, operating voltage is applied to the alternate working contacts 229 of the relay 142 and to the magnet winding of the delayed-action relay 194. As a result, the magnet coil 228 of the relay 142 causes the shaft 231 of the relay carrying a contact arm 232 to move the relay 142, by way of a ratchet 233 and operating lever 234 provided with a spring urged pawl 235, to advance by one step, that is, to move this relay 142 from one of its operative or working contacts to an inoperative contact or OFF position as shown in the drawing.

By then pressing the starting button 137 the switch 175 is closed, thus applying operating voltage to the solenoid 6. This, in turn, causes operation of the foot-switch 2 by way of the chain coupling 177. As a result, the sewing machine 1 is started, the work displacing frame 4 is lowered upon the workpiece 10 and the stitch-forming tools as indicated at 247, Fig. 2, begin to operate. The work displacing frame 4 controlled by the presser foot 3 causes the workpiece to be displaced during the sewing of a button-hole first in the fore and then in the aft direction, in a manner well known and understood by those skilled in the art.

The fore and aft movement of the work displacement frame is effected through the link 87 connected to the part 91, Fig. 1 of the sewing machine 1, this movement being transmitted to the supporting arms 24 and 27 and, in turn, to the base plates 65 and 66 which slide in the beds 78 and 79. From this, it is seen that the carriage 9 supporting the workpiece 10 follows the movement of the work displacing frame 4, whereby distortions of the workpiece 10 are substantially avoided.

After starting of the machine, the starting lever 139, Figs. 1 and 6, opens the contact 141 through the further actuating lever 140, whereby to release the operating lever 234 of the magnet winding 228 of the relay 142. Upon completion of an operating cycle, the sewing machine 1 is automatically stopped, resulting in the actuating lever 140 closing the contact 141, whereby to reenergize the magnet winding 228, thus operating the relay 142 to ON position.

As a result, the circuit of the feed motor 143 is closed through lines 226 and 236, causing a starting of said motor and driving of the pinion 17 through worm 155 and gear 154 and, in turn, advancing the carriage 9 in the manner described hereinbefore. At the same time, the carriage 9 is displaced at right angle to the advance movement by the profiled rail 15 being forced out of the recesses 135 and having its linear edge engaging the rear guide rollers 16.

The advance movement continues until the switches 121 and 122 are closed temporarily by the first pair of switch actuators 123 and 124. Upon closing of the switch 121, the auxiliary magnet winding 237 of the relay 142 is energized and the ratchet 233 advanced by one step, thus operating the relay 142 to its Off position. As a result, the motor 143 is disconnected, to terminate the advance movement and placing the work in position for the sewing of the second button-hole.

Prior to closing of the switch 121, switch 122 has been closed. As a result, a current pulse is impressed upon the capacitor 195 shunting the delayed-action relay 194. This pulse charges the capacitor 195 instantaneously, the charge being subsequently applied to the relay 194 whose operating contact 194a is connected in parallel to the starting switch 175 and, in turn, serve to control the solenoid 6. The design of the circuit parameters is such as to cause a sufficiently long discharge current of the capacitor 195 to insure safe starting of the machine.

The aforedescribed operations are automatically repeated until all the switch-actuators 123 and 124 have passed the switches 121 and 122. At the end of the last operating cycle, contact 141 is reclosed upon stopping of the machine 1. As a result, the feed motor 143 is started a last time. The final actuator 178 positioned immediately after the last pair of actuators 123 and 124 and arranged to operate switch 121 only, produces a final current pulse energizing auxiliary winding 237 of the relay 142, thus operating the latter to Off position and disconnecting the feed motor 143.

Upon subsequent depressing of the push-button switch 262 and pedal 32, the electromagnetic pressure devices 98 are disconnected and the upper part of the carriage 9 raised in the manner described, to enable removal of the workpiece 10. Upon fully depressing the pedal 32, the carriage 9 is automatically returned to starting position by the rope 134, Fig. 3, which has been tensioned during the advance movements.

More specifically, the return of the carriage 9 is effected by the connecting slide rods 76 connected to the forks 28 and 29 of the supporting arms 24 and 27 through the ball-joints 77, Figs. 7, 9, said rods during raising of the arms 24 and 27 sliding within the bores 75 in the connecting members 71 and 72 and transmitting their movement to the slidable members 55 and 56 through rods 67 and 68. At the same time, the front guide rollers 16 are disengaged from the profiled rail 15, whereupon the release lever 119 connected with the slidable member 55 lifts the arm 118 of the pawl 114 causing the latter to be disengaged from the rack 113, Figs. 14, 16 and 17. As a result, the rope 134 returns the carriage 9 to its starting position.

By operating the power switch 179 to its Off position a contact 181 is closed briefly energizing the auxiliary magnet winding 237 of the relay 142, whereby to operate the relay 142 to its On position in the disconnected position of the device. In this case, the feed motor 143 is not started since the line 226 is disconnected from the power source. On the other hand, upon renewed connection of the control device 11, the winding 228 is energized, causing the relay 142 to be operated to its Off position. The foregoing switching operations are necessary on account of the fact that the winding 228 in the rest position of the sewing machine 1 is permanently connected to the power source. As a result, the armature is released upon interrupting the current and would cause operation of the relay 142 to On position upon reclosing, and, in turn, an immediate starting of the feed motor 143 with the beginning of the first operating cycle.

In the example illustrated, the pilot lamp 189 is lit at the end of each operating cycle. Failure of the lamp to light indicates a shift in the relative position of the relay 142. This condition may be corrected by operation of auxiliary switch 191.

In the foregoing, the invention has been described with reference to one specific illustrative device and circuit. It will be evident, however, that numerous variations and modifications, as well as the substitution of equivalent elements for those shown for illustration, may be made without departing from the broader spirit and scope of the invention as set forth in the appended claims. The specification and drawings are accordingly to be regarded in an illustrative rather than in a limiting sense.

I claim:

1. The combination with a group-stitch sewing or the like machine of the type having stitch forming mechanism, electrically actuatable starting means for initiating a stitching cycle and stop motion means to arrest the machine upon completion of a stitching cycle, of automatic control apparatus comprising a movable carriage having means for supporting a work piece to be operated on by said stitch forming mechanism at a plurality of predeterminedly spaced operating points, electrical drive means to advance said carriage past said stitch forming mechanism from one to the next operating point, first switch means connected to said machine for operation to open and closed positions, respectively, during the operative and non-operative conditions of said machine, step relay means to control said drive means having contacts alternately operable by successive energizing current pulses from closed to open position, and vice versa, said step relay means controlled by said first switch means upon stopping of said machine to energize said drive means upon completion of a stitching cycle after manual initiation of a first stitching cycle by said starting means, second switch means to control said step relay means and actuatable by said carriage at predetermined operating positions thereof to arrest said drive means upon reaching of successive carriage positions corresponding to said predetermined operating points, third switch means similar to said second switch means and actuatable by said carriage at points corresponding to said operating points and delayed-action starting pulse producing means controlled by said third switch means, to operate said starting means and to initiate a stitching cycle upon reaching of successive operating positions of said carriage.

2. Apparatus as claimed in claim 1, wherein said second and third switch means are controlled by a plurality of spaced actuator elements adjustably secured to said carriage.

3. Apparatus as claimed in claim 1, wherein said carriage comprises a pair of hinged frames supporting the work piece clamped therebetween under pressure, and means to temporarily release said pressure to enable insertion and removal of said work piece.

4. Apparatus as claimed in claim 1, including camming means resiliently engaging a profiled member upon said carriage to provide a component of movement of said carriage laterally to the advance movement by said drive means from one to the next operating point.

5. Apparatus as claimed in claim 1, wherein said second and third switch means are controlled by an array of pairs of adjacent actuator elements spacedly and adjustably secured to said carriage, and a single actuator at the end of said array to prevent restarting of the machine at the end of a total operating programme determined by the number of actuator pairs.

6. Apparatus as claimed in claim 5, including means to return said carriage to starting position upon operation of said single actuator element at the end of a complete operating programme.

7. In combination with a group-switch sewing and the like machine of the type having stitch-forming means, starting means for said machine, an electromagnet to control said starting means for initiating a group-stitching cycle upon energization by a starting current pulse and automatic stop-motion means to arrest the machine upon completion of a stitching cycle, a discrete-position work feed control system for effecting a plurality of group-stitching operations at predeterminedly spaced operating points of a work piece comprising a movable carriage having means for supporting said work piece, electric drive means to advance said carriage from one to the next operating point, first switch means operable to open and closed position, respectively, during the operative and non-operative conditions of said machine, relay means having a pair of input circuits and alternately operable from closed to open position, and vice versa, by energization of either of said input circuits by a control current pulse, a manual starting switch to energize said electromagnet, means to control one of said relay input circuits by said first switch means upon stoppage of said machine after completion of a stitching cycle to energize said drive means, second switch means and the other of said relay input circuits, a plurality of actuating means for said second switch means upon said carriage spaced at relative distances corresponding to the spacing of said operating points to arrest said drive means upon advance of said carriage from one to the next operating point, third switch means and actuating means therefore upon said carriage similar to and adjacent to each of said last-mentioned actuating means, and a starting relay having output contacts in parallel to said manual starting switch and having an input circuit controlled by said third switch means to energize said electromagnet and to initiate successive group-stitching cycles of said machine upon stoppage of said drive means by said second switch means after completion of a first stitching cycle initiated by said manual starting means.

8. In a position control system as claimed in claim 7, including delayed-action means for said starting relay to initiate a stitching cycle after stoppage of said drive means by said second switch means.

9. In a position control system as claimed in claim 7, including a further actuating means upon said carriage for said second switch means to finally stop said drive means and machine upon termination of a complete operating programme of successive group-stitching operations.

10. In combination with a sewing or the like machine of the type having operating means, electrically-actuatable starting means for initiating an operating cycle and stop-motion means to automatically arrest said machine upon completion of the operating cycle, a discrete-position work feed control system to advance a work piece to be operated on at a plurality of predeterminedly spaced operating points comprising a movable carriage having means for supporting said work piece, electric drive means to advance said carriage from one to the next operating point, first switch means operable to open and closed positions, respectively, responsive to the operative and non-operative condition of said machine, relay means having a pair of control circuits to control said drive means and operable alternately from closed to open position, and vice versa, by energization of either of said control circuits by a control current pulse, a manual starting switch to energize said starting means, means to energize one of said relay control circuits by said first switch means upon stoppage of said machine and completion of an operating cycle to energize said drive means, second switch means and the other of said relay control circuits, a plurality of actuating means for said second switch means upon said carriage spaced at relative distances corresponding to the spacing of said operating points to arrest said drive means upon advance of said carriage from one to the next operating point, third switch means and actuating means therefor upon said carriage similar to and adjacent to each of said last-mentioned actuating means, and a starting relay having output contacts in parallel to said manual starting switch and an input circuit controlled by said third switch means to energize said starting means and to initiate successive operating cycles of said machine upon stoppage of said drive means by said second switch means after completion of a first operating cycle initiated by said manual starting switch.

11. In a position control system as claimed in claim 10, delayed-action means for said starting relay to initiate an operating cycle of said machine after stoppage of said drive means by said second switch means.

12. In a position control system as claimed in claim 10, comprising a further actuating means upon said carriage for said second switch means to finally stop said drive means and machine upon termination of a complete operating programme of successive group-stitching operations.

13. In a system as claimed in claim 10, wherein said drive means is an electric motor controlled by said first relay means and driving a pinion cooperating with a rack forming part of said carriage.

14. A system as claimed in claim 10, wherein said carriage comprises a pair of clamping rails to support a workpiece clamped therebetween under pressure, one of said rails forming a rack cooperating with a pinion driven by said drive means.

15. A system as claimed in claim 10, wherein said pinion is driven by said drive means through a shaft including a pair of spaced ball joints and supported by a pivoted lateral supporting arm subject to the action of a return spring, and a pressure roller supported by a similar pivoted supporting arm and engaging the opposite end of said last-named clamping rail.

16. A system as claimed in claim 10, including a profiled guide rail movable with said carriage and cooperating with spring-pressed pressure rollers to control the lateral movement of said carriage at right angle to the feed movement thereof in the direction from one to the next operating point.

References Cited in the file of this patent

UNITED STATES PATENTS

| | | |
|---|---|---|
| 1,490,412 | Blood | Apr. 15, 1924 |
| 1,492,084 | Ray | Apr. 29, 1924 |
| 1,512,574 | Blood | Oct. 21, 1924 |
| 1,570,369 | Blood et al. | Jan. 19, 1926 |
| 1,773,130 | Denniston | Aug. 19, 1930 |
| 1,975,007 | Kingsbury | Sept. 25, 1934 |
| 2,029,335 | Oberhoffken et al. | Feb. 4, 1936 |
| 2,465,232 | Jones et al. | Mar. 22, 1949 |